UNITED STATES PATENT OFFICE.

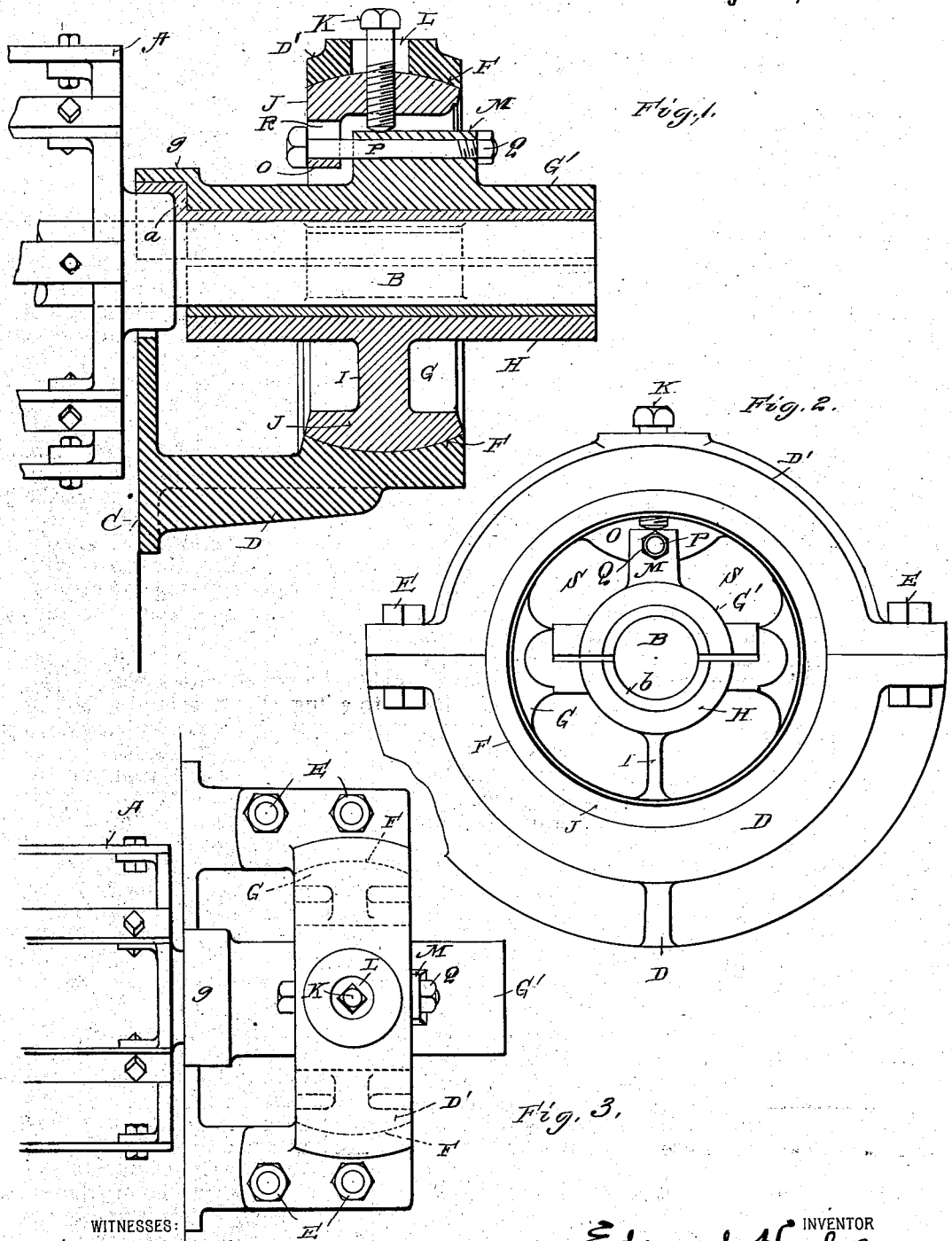

EDWARD HUBER, OF MARION, OHIO.

SELF-ADJUSTING JOURNAL-BEARING.

SPECIFICATION forming part of Letters Patent No. 604,936, dated May 31, 1898.

Application filed December 20, 1897. Serial No. 662,531. (No model.)

*To all whom it may concern:*

Be it known that I, EDWARD HUBER, a citizen of the United States, residing at Marion, in the county of Marion and State of Ohio, have invented certain new and useful Improvements in Self-Adjusting Journal-Bearings, of which the following is a specification, reference being had therein to the accompanying drawings.

My invention relates to improvements in self-adjusting journal-bearings for use in situations where shafts are exposed to the liability of getting out of true and which would therefore bind and cut in their bearings unless the bearings will yield to the irregularities thus developed in the shafts.

In my invention I have produced a new arrangement and organization and some new features of construction, and I have also designed my bearing for use specially with the cylinders of threshing-machines.

The peculiarities of my device will be hereinafter fully explained, and particularly pointed out in the claims.

In the accompanying drawings, on which like reference-letters indicate corresponding parts, Figure 1 is an axial sectional view of my improved bearing and a side elevation of one end of a threshing-machine cylinder and its journal or shaft. Fig. 2 is an end elevation of the same parts, and Fig. 3 is a plan view thereof.

The letter A designates a threshing-machine cylinder composed, as usual, of a head and a series of bars and having a journal or shaft B. I show this device in connection with my improved bearing because I specially design that the bearing shall be used in connection with threshing-machines, but I wish to be distinctly understood as not intending to limit myself to any such use or combination.

The letter C designates a part of the frame or casing, which incases the thresher-cylinder, and to this frame or casing I cast, preferably, though I may otherwise secure to it, the stationary part of my bearing, which I term the "support" D. Of course when using my bearing with other than threshing-machine-cylinder shafts this support will be otherwise sustained.

The support D is composed of a lower part and an upper part. The latter I designate D', and it is removable from the lower part, but is held thereto by means of bolts E. These parts are fashioned with a curved seat F, in which I mount the box G, the same being composed of a sleeve-like portion H, a web I, and a head J, whose exterior is of like globular form with the seat F, so that the box G will freely oscillate in any direction in the support D. Upon this box G is a cap G'. This cap is held down upon the shaft, there being the usual boxing or babbitt lining, by means of a set-screw K, screwed through the head J and bearing upon the top of the cap, as clearly shown in Figs. 1 and 2. This screw K passes through a slot L in the upper part of the support D', the slot being sufficient to prevent the screw K from striking the support when the box oscillates.

For the purpose of adjusting the shaft endwise I provide the cap G' with a boss M and the box with a lug O and extend a bolt P through the lug and the boss and provide it with a nut Q. By screwing the latter onto the bolt the shaft will be adjusted inward, and by likewise manipulating the same parts at the other end of the shaft it will be adjusted in the opposite direction until it is finally set where desired. The cap is shouldered, as shown at *g*, and the head of the cylinder A forms a shoulder *a*. These shoulders, with the intervening boxing or lining, come into action when the shaft is adjusted longitudinally away from the bearing by the action of the bolt P.

Thus it will be seen that I have provided a self-adjusting bearing which will adjust itself to any irregularities or lack of trueness in the shaft or in case the shaft gets out of the original line in which it was, and at the same time have made the cap capable of longitudinal adjustment, so as to properly set the shaft in that respect, and that I have also provided a means of holding the cap to its place without interfering with the oscillations of the box. The web I is cut away to form an opening S, as seen in Fig. 2, for the insertion of the cap through the box. The simplicity of the device is also obvious, for by simply removing the bolts E the parts can be readily disengaged.

As before observed, I form the support D in one piece with or connected to the frame or casing for the cylinder when the bearing is to be used with threshing-machines. In other cases the support D is otherwise suitably maintained.

Having thus fully described my invention, what I claim as new, and desire to secure by Letters Patent, is—

1. In a self-adjusting bearing, the combination with a support, of a box so mounted within the support as to form a joint permitting of universal adjustment, a cap for the box and means carried by the box to clamp down on the cap, and other means to adjust the cap longitudinally and in turn the shifting of the shaft.

2. In a self-adjusting bearing, the combination with a support, of a box so mounted within the support as to form a joint permitting of universal motion, a cap for the box, a clamping-screw mounted in the box and clamping upon the cap and an adjusting-bolt engaging with the box and cap to shift the latter longitudinally.

3. In a self-adjusting bearing, the combination with a support having a curved seat, of a box having a globular exterior fitted to said seat, a cap for said box extending within the upper half of said box, and a clamp-screw carried by the box and adapted to engage with said cap, whereby the cap is held within the box, substantially as shown and described.

4. In a self-adjusting bearing, the combination with a support and a curved seat, of a box having a globular exterior mounted in said seat, a lug and a bolt extending through the lug, and a cap for the box having a boss through which the bolt extends for adjusting the cap longitudinally.

5. In a self-adjusting bearing, the combination with a support having a slot, of a box having a screw extending through said slot and a cap on the box against which the screw clamps.

6. In a self-adjusting bearing, a box having a lug, a bolt extending through it, and a cap on the box and having a boss with which said bolt engages.

7. In a self-adjusting bearing, the combination with a frame or casing and a support secured thereto and having a curved seat, of a box having a globular exterior mounted in said bearing and a shaft mounted in the box.

8. In a self-adjusting bearing, the combination with a frame or casing, of a support secured to the frame or casing and encircling the shaft, and having a curved seat, a box having a globular exterior mounted in said seat, a cap for the box, means carried by the box to clamp down on the cap, and means for adjusting the cap longitudinally and with it said shaft with respect to the box.

In testimony whereof I affix my signature in presence of two witnesses.

EDWARD HUBER.

Witnesses:
JOHN J. CRAWLEY,
JOHN A. SCHROEKS.